US011266969B2

(12) United States Patent
Matsuoka et al.

(10) Patent No.: US 11,266,969 B2
(45) Date of Patent: Mar. 8, 2022

(54) FLUID TREATMENT SYSTEM

(71) Applicant: KOBE STEEL, LTD., Hyogo (JP)

(72) Inventors: Akira Matsuoka, Kobe (JP); Tsuyoshi Kakio, Kobe (JP); Yuji Kurishiro, Kobe (JP); Fumiaki Suzuki, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 17/257,179

(22) PCT Filed: Jul. 9, 2019

(86) PCT No.: PCT/JP2019/027215
§ 371 (c)(1),
(2) Date: Dec. 30, 2020

(87) PCT Pub. No.: WO2020/026724
PCT Pub. Date: Feb. 6, 2020

(65) Prior Publication Data
US 2021/0121843 A1 Apr. 29, 2021

(30) Foreign Application Priority Data
Jul. 30, 2018 (JP) .............................. JP2018-142302

(51) Int. Cl.
*B01J 19/00* (2006.01)
*B08B 9/00* (2006.01)
*B08B 9/02* (2006.01)
*B08B 9/027* (2006.01)
*B08B 9/032* (2006.01)

(52) U.S. Cl.
CPC ....... *B01J 19/0006* (2013.01); *B01J 19/0046* (2013.01); *B08B 9/032* (2013.01)

(58) Field of Classification Search
CPC .... B01J 19/00; B01J 19/0006; B01J 19/0046; B01J 2219/00; B01J 2219/00781; B01J 2219/00801; B01J 2219/0081; B01J 2219/00813; B01J 2219/00851; B01J 2219/00871; B01J 2219/00891; B01J 2219/00925; B01J 2219/0093; B01J 2219/0099; B08B 9/00; B08B 9/02; B08B 9/027; B08B 9/032; B08B 9/0321; B08B 9/0323; B08B 9/0325
See application file for complete search history.

(56) References Cited

U.S. PATENT DOCUMENTS

| 8,592,220 B2 * | 11/2013 | Bergh ................... G01N 31/10 436/180 |
| 2008/0081005 A1 | 4/2008 | Suzuki et al. |
| 2016/0333304 A1 * | 11/2016 | Leibnitz ................... A23L 2/72 |

* cited by examiner

Primary Examiner — Natasha E Young
(74) Attorney, Agent, or Firm — Studebaker & Brackett PC

(57) ABSTRACT

Provided is a fluid treatment system, including: a plurality of fluid channel devices arranged in series along a regular channel; a plurality of flow control valves each adjusting the flow rate of a treatment target fluid flowing into each of the plurality of fluid channel devices; a flow control valve provided on the upstream side of the plurality of fluid channel device and operable to change the flow rate of the treatment target fluid flowing into each of the plurality of fluid channel device; a bypass channel allowing the treatment target fluid to flow so as to bypass the fluid channel device in which abnormality has occurred, and a plurality of bypass selector valves selectable between a state of allowing the flow of the treatment target fluid in the bypass channel and a state of blocking the flow.

7 Claims, 8 Drawing Sheets

FLUID TREATMENT SYSTEM

RELATED APPLICATIONS

This application is a national stage application claiming priority to PCT/JP2019/027215, now WO2020/026724, filed on Jul. 9, 2019, which claims priority to Japanese Patent Application Serial No. JP 2018-142302, filed on Jul. 30, 2018.

TECHNICAL FIELD

The present invention relates to a fluid treatment system for treating a treatment target fluid as an object to be treated while allowing the fluid to flow to thereby generate a proposed target fluid.

BACKGROUND ART

Conventionally, a fluid treatment system is known for treating a treatment target fluid as an object to be treated while allowing the fluid to flow to thereby generate a proposed target fluid. As such a fluid treatment system, there is one that mixes a plurality of types of treatment target fluids and chemically reacts them with each other to thereby generate a target fluid. An example thereof is disclosed in Patent Literature 1 below.

Patent Literature 1 discloses a chemical synthesis apparatus. The apparatus includes a plurality of microreactors, each of which includes a channel. In the microreactor, a plurality of kinds of raw material solutions are mixed. This causes a proposed product solution to be produced.

The chemical synthesis apparatus further includes a temperature sensor installed in the microreactor. The temperature sensor measures the channel temperature of the microreactor in real time.

The plurality of microreactors are arranged in parallel. The chemical synthesis apparatus includes a plurality of on-off solenoid valves provided on respective inlet sides and outlet sides of the plurality of microreactors, respectively, a single pump for feeding a raw material solution to each of the plurality of microreactors, and a control system. The control system performs opening and closing the solenoid valves and a flow control of the pump in accordance with the temperature in the channel that is measured by the temperature sensor.

In the chemical synthesis apparatus, it is possible to block the supply of the raw material solution to any one of the microreactors, in which an abnormality has occurred, by closing a solenoid valve disposed on the inlet side of the microreactor. However, it is difficult to appropriately adjust the amount of the raw material solution to be fed into the other microreactors in this emergency. That is because each of the other microreactors is supplied with raw material solution from the single pump.

The amount of the raw material solution to be fed into each of the other microreactors can be adjusted by a flow control valve which is provided on the inlet side of each of the other microreactors. It is, however, not realistic to provide such a flow control valve, which is expensive, on the upstream side of each of all the microreactors.

CITATION LIST

Patent Literature

Patent Literature 1: Japanese Unexamined Patent Publication No. 2008-80306

SUMMARY OF INVENTION

It is an object of the present invention to provide a fluid treatment system including a plurality of fluid channel devices each of which performs a predetermined treatment on a treatment target fluid while allowing the treatment target fluid to flow, the fluid treatment system allowing the flow rate of the treatment target fluid flowing into each of the plurality of fluid channel devices to be appropriately adjusted by use of a small number of flow control valves, and being capable of reducing the decrease in the treatment amount of the treatment target fluid by the entire fluid treatment system due to an abnormality that may occur in any of the plurality of fluid channel devices.

Provided is a fluid treatment system, including a plurality of fluid treatment modules arranged in parallel with each other, each of which performs a predetermined treatment on a treatment target fluid as an object to be treated while allowing the treatment target fluid to flow in the fluid treatment module to thereby generate a proposed target fluid. Each of the plurality of fluid treatment modules includes: a regular channel that allows the treatment target fluid to flow in the regular channel; a plurality of fluid channel devices arranged in series along the regular channel, each of the plurality of fluid channel devices being configured to perform a predetermined treatment on the treatment target fluid while allowing the treatment target fluid to flow in the fluid channel device, the plurality of fluid channel devices being provided in the regular channel so as to cause the treatment target fluid flowing in the regular channel to flow through all of the plurality of fluid channel devices; a flow control valve provided on an upstream side of the plurality of fluid channel devices in the regular channel with respect to a direction in which the treatment target fluid flows, the flow control valve being operable to change a flow rate of the treatment target fluid flowing into each of the plurality of fluid channel devices; a plurality of bypass channels provided for the plurality of fluid channel devices, respectively, each of the plurality of bypass channels allowing the treatment target fluid to flow so as to bypass the fluid channel device that corresponds to the bypass channel out of the plurality of fluid channel devices; and a plurality of bypass selector valves provided for the plurality of bypass channels, respectively, each of the plurality of bypass selector valves being selectable between a state of allowing the treatment target fluid to flow in the bypass channel corresponding to the bypass selector valve out of the plurality of bypass channels and a state of blocking the treatment target fluid.

DESCRIPTION OF EMBODIMENTS

Below will be specifically described embodiments of the present invention with reference to the attached drawings.

Figure 1:
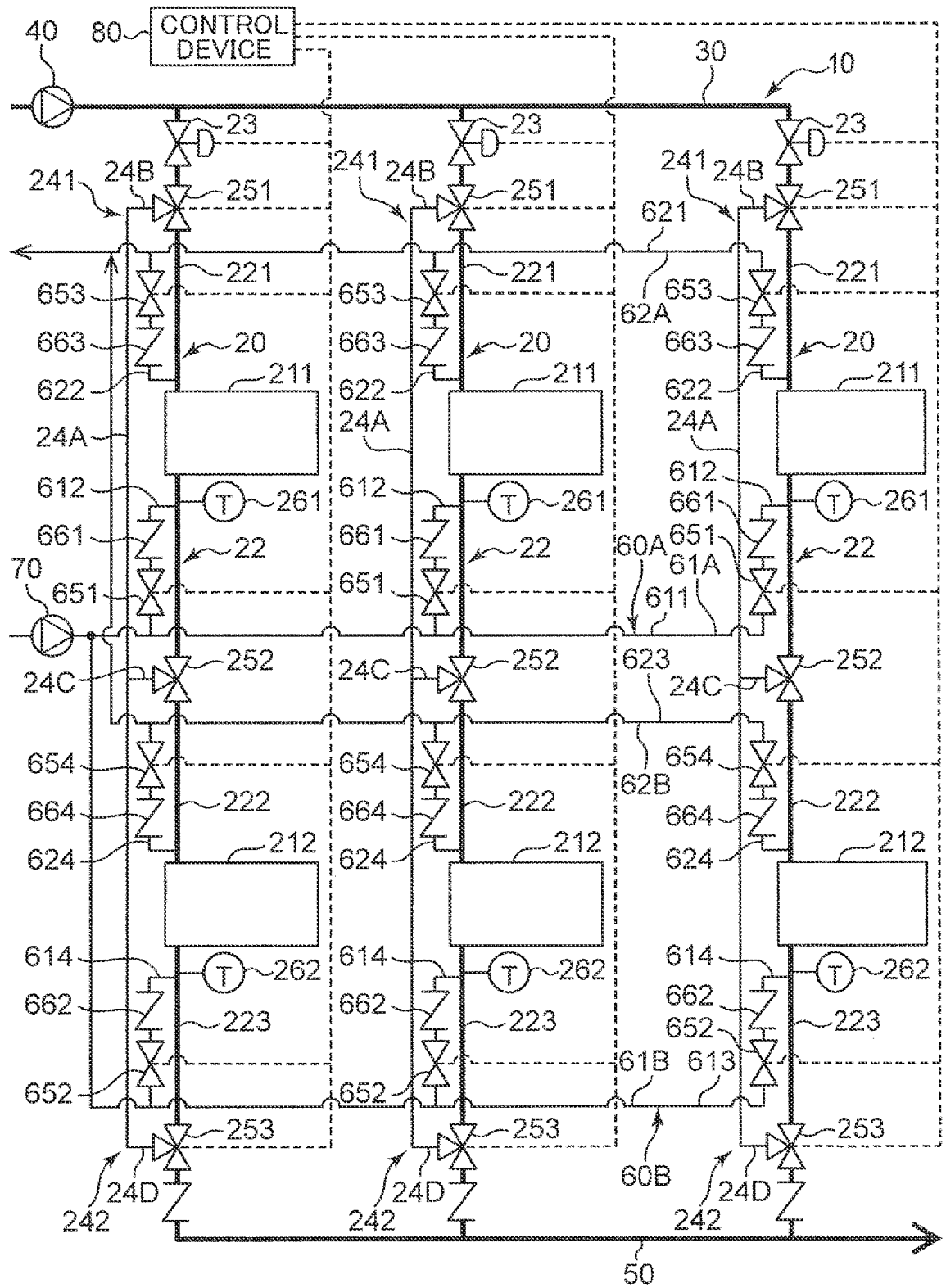
FIG. 1 is a flow sheet showing a state in which a treatment target fluid flows in all of regular channels in a fluid treatment system according to an embodiment of the present invention.

Referring to FIG. 1, will be described a fluid treatment system 10 according to an embodiment of the present invention. FIG. 1 is a flow sheet showing the configuration of the fluid treatment system 10.

The fluid treatment system 10 performs a predetermined treatment on a treatment target fluid as an object to be treated while allowing the treatment target fluid to flow to thereby generate a proposed target fluid.

The treatment target fluid is composed of, for example, a plurality of kinds of raw material solutions mixed with each other. The plurality of types of raw material solutions described above may be mixed either before or after the start of the treatment. The plurality of kinds of raw material solutions may be dissolved in a solvent.

The above predetermined treatment is, for example, adjusting a reaction temperature when the plurality of kinds of raw material solutions described above are mixed and reacted.

The fluid treatment system 10 includes: a plurality of fluid treatment modules 20; a common supply channel 30 that allows a treatment target fluid, which is to be supplied to each of the plurality of fluid treatment modules 20, to flow in the common supply channel 30; a treatment target fluid supply pump 40 that makes the treatment target fluid flow in the common supply channel 30; a common discharge channel 50 that allows a target fluid generated in each of the plurality of fluid treatment modules 20 to flow in the common discharge channel 50; a first cleaning channel forming section 60A; a second cleaning channel forming section 60B; a cleaning fluid supply pump 70; and a control device 80 that controls the predetermined treatment to be performed in each of the plurality of fluid treatment modules 20.

Each of the plurality of fluid treatment modules 20 performs a predetermined treatment on the treatment target fluid while allowing the treatment target fluid to flow in the fluid treatment module 20 to thereby generate a proposed target fluid. The plurality of fluid treatment modules 20 are arranged in parallel with each other. The treatment target fluid supply pump 40 supplies a treatment target fluid to each of the plurality of fluid treatment modules 20.

Each of the plurality of fluid treatment modules 20 includes a plurality of (in this embodiment, two) fluid channel devices 211 and 212, a regular channel 22, a flow control valve 23, a plurality of (in this embodiment, two) bypass channels 24, a plurality of (in this embodiment, three) channel selector valves 251, 252 and 253, and a plurality of (in this embodiment, two) fluid information acquisition devices 261 and 262. These are explained as follows.

Each of the fluid channel devices 211 and 212 in each of the fluid treatment modules 20 performs a predetermined treatment on the treatment target fluid while allowing the treatment target fluid to flow therein. In each fluid treatment module 20, the fluid channel devices 211 and 212 are arranged in series in this order. Each of the fluid channel devices 211 and 212 is, for example, a microchannel reactor inside which at least one microchannel is formed. The at least one microchannel is, for example, a plurality of reaction channels formed so as to extend in parallel with each other. The at least one microchannel may, alternatively, be a single reaction channel. In the above reaction channel, a fluid is made to flow for causing a chemical reaction.

The regular channel 22 is provided to allow the treatment target fluid to flow through the fluid channel devices 211 and 212 in this order in each of the fluid treatment modules 20. In other words, the fluid channel devices 211 and 212 are arranged in the regular channel 22 in series along the regular channel 22. Specifically, the regular channel 22 includes a supply channel 221, an intermediate channel 222, and a discharge channel 223.

In the supply channel 221, there flows a treatment target fluid to be supplied to the fluid channel device located on the most upstream side in the direction in which the treatment target fluid flows (namely, the fluid channel device 211 in the example shown in FIG. 1) out of the plurality of fluid channel devices. The supply channel 221 has an upstream end connected to the common supply channel 30 and a downstream end connected to the fluid channel device 211. The supply channel 221 thereby allows the treatment target fluid that has flowed in the common supply channel 30 to be supplied to the fluid channel device 211 through the supply channel 221.

The intermediate channel 222 interconnects the two fluid channel devices out of the plurality of fluid channel devices, the two fluid channel devices being adjacent to each other in the direction in which the treatment target fluid flows. In the example shown in FIG. 1, the two fluid channel devices are the fluid channel device 211 and the fluid channel device 212, and the intermediate channel 222 has an upstream end connected to the fluid channel device 211 and a downstream end connected to the fluid channel device 212. The intermediate channel 222 allows the fluid discharged from the fluid channel device 211, that is, the treatment target fluid that has been treated in the fluid channel device 211, to flow into the fluid channel device 212 through the intermediate channel 22.

In the discharge channel 223, there flows a treatment target fluid discharged from the fluid channel device, out of the plurality of fluid channel devices, located on the most downstream side in the direction in which the treatment target fluid flows, namely, the fluid channel device 212 in the example shown in FIG. 1. In other words, in the discharge channel 223 flows a target fluid which is generated by the predetermined treatment by each of the plurality of fluid channel devices 211 and 212. The discharge channel 223 has an upstream end connected to the fluid channel device 212 and a downstream end connected to the common discharge channel 50. The discharge channel 223 thereby allows the fluid discharged from the fluid channel device 212, namely, the target fluid, to flow into the common discharge channel 50 through the discharge channel 223.

The flow control valve 23 is operable to change the flow rate of the treatment target fluid to flow into the fluid channel devices 211 and 212. The flow control valve 23 is provided in the supply channel 221. In detail, the flow control valve 23 is provided at a position in the regular channel 22 and on the upstream side of the fluid channel devices 211 and 212 with respect to the direction in which the treatment target fluid flows.

The plurality of bypass channels 241 and 242 are provided for the plurality of fluid channel devices 211 and 212, respectively, and disposed to allow the treatment target fluid to flow so as to bypass the fluid channel device corresponding to the bypass channel out of the fluid channel devices 211 and 212.

Figure 2:
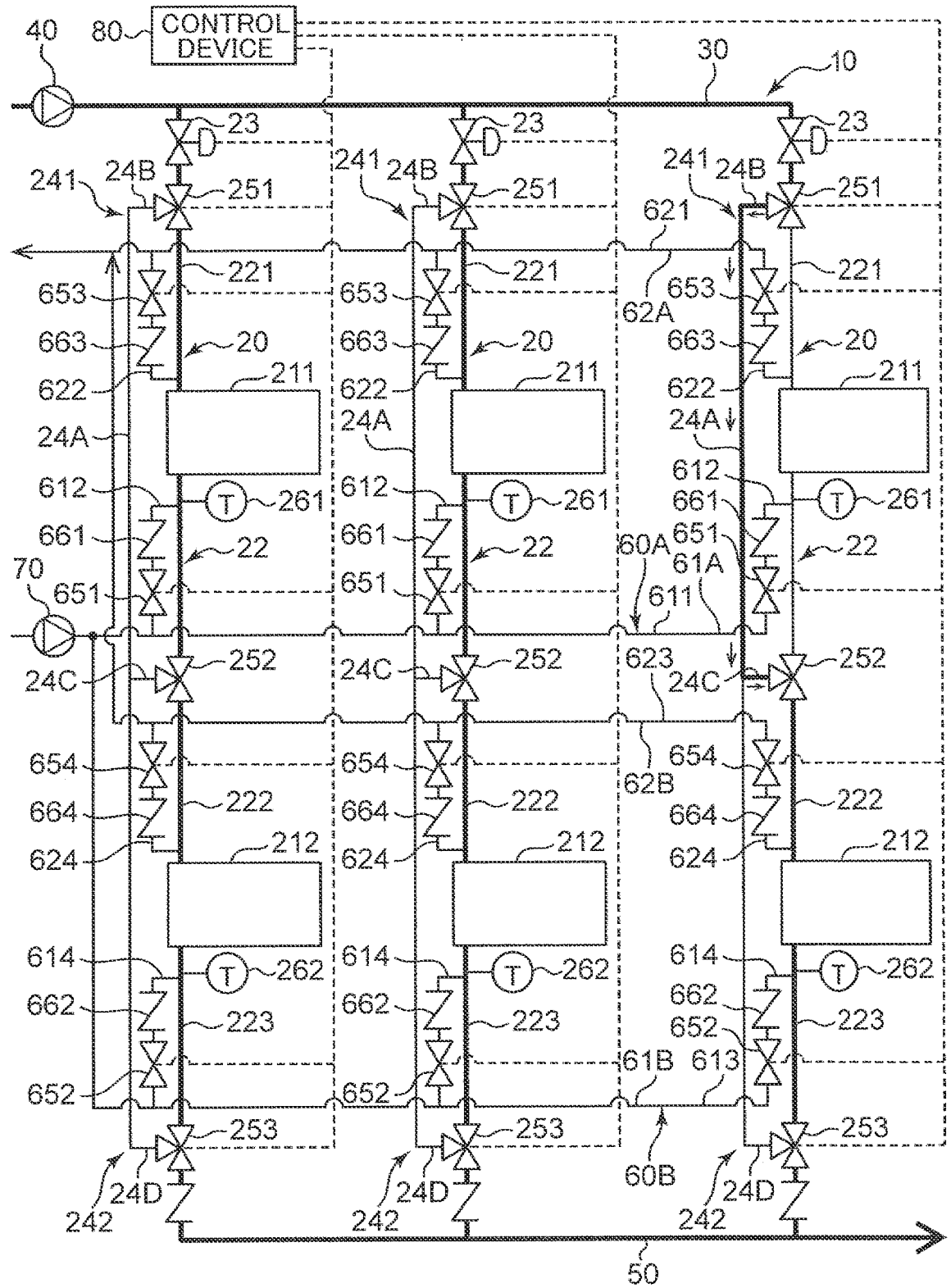
FIG. 2 is a flow sheet showing a state in which the treatment target fluid flows in a bypass channel that bypasses a specific upstream fluid channel device in the fluid treatment system.
Figure 3:
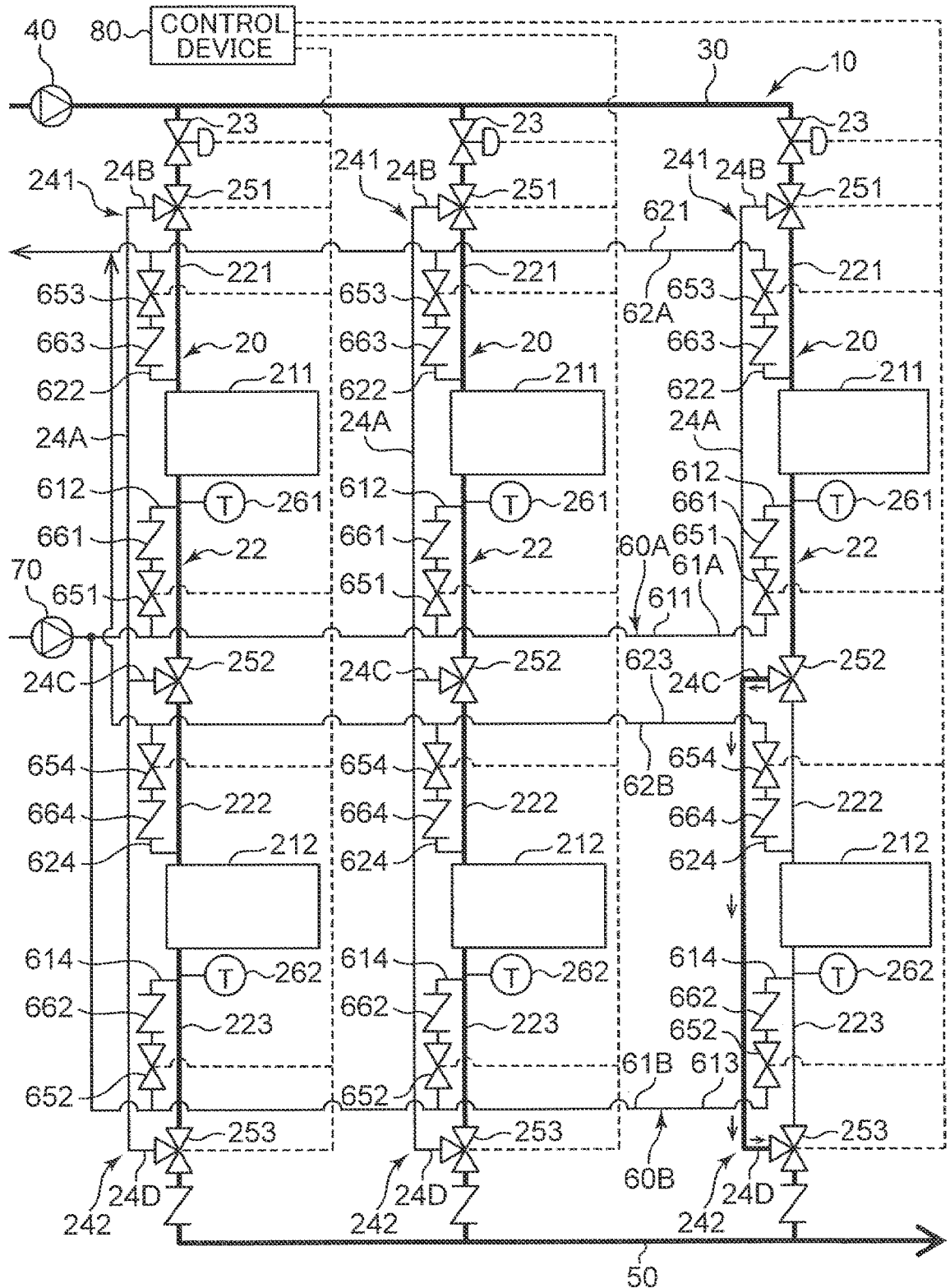
FIG. 3 is a flow sheet showing a state in which the treatment target fluid flows in a bypass channel that bypasses a specific downstream fluid channel device in the fluid treatment system.

Specifically, as shown in FIG. 2, the bypass channel 241 interconnects the supply channel 221 which is a channel on the upstream side of the fluid channel device 211 and the intermediate channel 222 which is a channel on the downstream side of the fluid channel device 211, so as to bypass the fluid channel device 211, thereby allowing the fluid (the treatment target fluid) to flow from the supply channel 221 to the intermediate channel 222 directly without passing through the fluid channel device 211. Besides, as shown in FIG. 3, the bypass channel 242 interconnects the intermediate channel 222 which is a channel on the upstream side of the fluid channel device 212 and the discharge channel 223 which is a channel on the downstream side of the fluid channel device 212 so as to bypass the fluid channel device 212, thereby allowing the fluid (the treatment target fluid that has passed through the fluid channel device 211) to flow from the intermediate channel 222 to the discharge channel 223 directly without passing through the fluid channel device 212.

The bypass channels 241 and 242 illustrated in FIG. 1 are constituted by a common channel 24A and a plurality of (three, in this embodiment) connection channels 24B, 24C and 24D that are connected to the common channel 24A. Specifically, the bypass channel 241 is formed of the connection channel 24B, a part of the common channel 24A located between the connection channels 24B and 24C, and the connection channel 24C. The bypass channel 242 is formed of the connection channel 24C, a part of the common channel 24A located between the connection channels 24C and 24D, and the connection channel 24D. The bypass channels 241 and 242, thus, share the connection channel 24C.

In the bypass channels 241 and 242 illustrated in FIG. 1, the part connected to the intermediate channel 222 is a common channel, namely, the connection channel 24C; however, respective parts of the bypass channels 241 and 242 connected to the intermediate channel 222 may be separate from each other.

As will be described later in detail, when no abnormality occurs in any of the fluid channel devices 211 and 212, the selection of the channels is performed so as to prevent the treatment target fluid from flowing in either of the bypass channels 241 and 242. When an abnormality occurs in the fluid channel device 211, the selection of the channels is performed so as to make the treatment target fluid flow in the bypass channel 241. When an abnormality occurs in the fluid channel device 212, the selection of the channels is performed so as to make the treatment target fluid flow in the bypass channel 242.

Each of the plurality of channel selector valves 251, 252, and 253 according to this embodiment is formed of a three-way selector valve, which is operable to select a channel to allow the treatment target fluid to flow therein. The plurality of channel selector valves 251, 252, and 253 are provided in the regular channels 22, respectively.

The plurality of channel selector valves 251, 252 and 253 are provided to a plurality of channels constituting the regular channel 22, namely, the supply channel 221, the intermediate channel 222 and the discharge channel 223, respectively. Specifically, the channel selector valve 251 is provided in the supply channel 221; the channel selector valve 252 is provided in the intermediate channel 222; and the channel selector valve 253 is provided in the discharge channel 223. The channel selector valve 251 is located downstream of the flow control valve 23.

The channel selector valve 251 is further connected to the connection channel 24B that forms the upstream end portion of the bypass channel 241. The channel selector valve 252 is further connected to the connection channel 24C that forms the downstream end portion of the bypass channel 241, which is also the upstream end portion of the bypass channel 242. The channel selector valve 253 is connected to the connection channel 24D that forms the downstream end portion of the bypass channel 242.

The channel selector valve 251 is provided for the fluid channel device 211 and the bypass channel 241 bypassing the fluid channel device 211, being located upstream of the fluid channel device 211. The channel selector valve 251 is selectable between a normal state of opening the supply channel 221 to allow the treatment target fluid to flow in the supply channel 221 and blocking the bypass channel 241 from the supply channel 221, and a bypass state of blocking the supply channel 221 and connecting the channel located on the upstream side of the channel selector valve 251 in the supply channel 221 to the bypass channel 241. The channel selector valve 251, thus, allows the treatment target fluid to flow in either the fluid channel device 211 or the bypass channel 241 that bypasses the fluid channel device 212. In other words, the channel selector valve 251 is selectable between a state of allowing the inflow of the treatment target fluid to the fluid channel device 211 and a state of blocking the inflow.

The channel selector valve 252 is provided for the fluid channel device 212 and the bypass channel 242 bypassing the fluid channel device 212, being located upstream of the fluid channel device 212. The channel selector valve 252 is selectable among a normal state of opening the intermediate channel 222 to allow the treatment target fluid to flow through the intermediate channel 222 and blocking the bypass channel 242 from the intermediate channel 222, a first bypass state of blocking the intermediate channel 222 and connecting the channel located downstream of the channel selector valves 252 in the intermediate channel 222 to the bypass channel 242, and a second bypass state of blocking the intermediate channel 222 and connecting the channel located upstream of the channel selector valves 252 in the intermediate channel 222 to the bypass channel 242. The channel selector valve 252, thus, allows the treatment target fluid having passed through the fluid channel device 211 to flow in either the fluid channel device 212 or the bypass channel 242 bypassing the fluid channel device 212. That is, the channel selector valve 252 allows either the treatment target fluid that has flowed through the bypass channel 241 or the treatment target fluid that has passed through the fluid channel device 211 to flow in the fluid channel device 212. In other words, the channel selector valve 252 is selectable between a state of allowing the inflow of the treatment target fluid to the fluid channel device 212 and a state of blocking the inflow.

The channel selector valve 253 is located downstream of the fluid channel device 212. The channel selector valves 253 is selectable between a normal state of opening the discharge channel 223 to allow the treatment target fluid to flow in the discharge channel 223 and blocking the bypass channel 242 from the discharge channel 223, and a bypass state of blocking the discharge channel 223 and connecting the channel located downstream of the channel selector valves 253 in the discharge channel 223 to the bypass channel 242. The channel selector valve 253, thus, allows either the target fluid that has passed through the fluid channel device 212 or the fluid that has flowed through the bypass channel 242 bypassing the fluid channel device 212 (the target fluid having passed through the fluid channel device 211) to flow in the common discharge channel 50. In other words, the channel selector valve 253 is selectable between a state of allowing the inflow of the treatment target fluid to the common discharge channel 50 and a state of blocking the inflow.

The plurality of channel selector valves 251 to 253, therefore, function as respective bypass selector valves that are provided for the plurality of bypass channels 241 and 242. Each of the channel selector valves 251 to 253 is configured to be selectable between a state of allowing the flow of the treatment target fluid in the corresponding bypass channel out of the plurality of bypass channels 241 and 242 and a state of blocking the flow. Meanwhile, the channel selector valves 251 to 253 also function as flow selector valves provided for the plurality of fluid channel devices 211 and 212, respectively. Each of the channel selector valves 251 to 253 is configured to be selectable between a state of allowing the flow of the treatment target fluid in the regular channel 22 at each of the positions of the upstream and downstream sides of the corresponding fluid channel device out of the plurality of fluid channel devices 211 and 212 and a state of blocking the flow.

The fluid treatment system according to this embodiment further includes a check valve disposed on the downstream side of the channel selector valve 253. The check valve prevents the target fluid from reversely flowing.

The channel selector valves 251, 252 and 253 are opened and closed to switch the channel in which the fluid flows. Specifically, switching the channel selector valve 251 to a state of allowing a fluid to flow in the bypass channel 241 and switching the channel selector valve 252 to a state of allowing the fluid that has flowed through the bypass channel 241, namely, the treatment target fluid, to flow through the fluid channel device 212 establishes a passage that allows a fluid (the treatment target fluid) to flow from the supply channel 221 to the intermediate channel 222 so as to bypass the fluid channel device 211, the passage including the bypass channel 241, as shown in FIG. 2. Besides, switching the channel selector valve 252 to a state of allowing a fluid to flow in the bypass channel 242 and switching the channel selector valve 253 to a state of allowing the fluid that has flowed through the bypass channel 242 (the treatment target fluid having passed through the fluid channel device 211) to flow in the common discharge channel 50 establishes a passage that allows a fluid (the treatment target fluid having passed through the fluid channel device 211) to flow from the intermediate channel 222 to the discharge channel 223 so as to bypass the fluid channel device 212, as shown in FIG. 3, the passage including the bypass channel 242. Furthermore, switching the channel selector valve 251 to a state of allowing a fluid (treatment target fluid) to flow through the fluid channel device 211, switching the channel selector valve 252 to a state of allowing a fluid (treatment target fluid having passed through the fluid channel device 211) to flow through the fluid channel device 212, and switching the channel selector valve 253 to a state of allowing the fluid that has flowed through the fluid channel device 212 (the treatment target fluid having passed through the fluid channel device 212) to flow in the common discharge channel 50 establishes a passage including the regular channel 22.

The fluid information acquisition devices 261 and 262 are provided for the fluid channel devices 211 and 212, respectively, to acquire fluid information that is the information on the treatment target fluid flowing through the fluid channel device and used for judging whether or not the fluid channel device is in an abnormal state. The fluid information acquisition devices 261 and 262 input the acquired fluid information to the control device 80.

The fluid information acquisition device 261 illustrated in FIG. 1 is provided for the fluid channel device 211 to acquire fluid information which is the information on the fluid flowing in the intermediate channel 222 provided on the downstream side of the fluid channel device 211. In short, the fluid information acquisition device 261 acquires information on the fluid that has passed through the fluid channel device 211.

The fluid information acquisition device 262 illustrated in FIG. 1 is provided for the fluid channel device 212 to acquire fluid information which is the information on the fluid flowing in the discharge channel 223 provided on the downstream side of the fluid channel device 212. In short, the fluid information acquisition device 262 acquires information on the fluid that has passed through the fluid channel device 212.

The fluid information may be any information that indicates the state of a fluid, which may be, for example, either information indicating the state of a fluid that has not passed through the fluid channel device yet or information indicating the state of a fluid that has already passed through the fluid channel device. The information indicating the state of a fluid is, for example, the pressure of a fluid, the temperature of a fluid, the viscosity of a fluid, or the like. Each of the fluid information acquisition devices 261 and 262 according to the present embodiment acquires the temperature of a fluid that has passed through the corresponding fluid channel device as the fluid information.

The first cleaning channel forming section 60A forms a plurality of (three in this embodiment) cleaning channels connected to the plurality of fluid channel devices 211 (three fluid channel devices 211 in this embodiment), respectively. Each of the plurality of cleaning channels allows a cleaning fluid for cleaning the fluid channel device 211 corresponding to the cleaning channel out of the plurality of fluid channel devices 211 to flow through the fluid channel device 211 in the direction opposite to the direction in which the treatment target fluid flows. Similarly, the second cleaning channel forming section 60B forms a plurality of (three in this embodiment) cleaning channels provided for the plurality of fluid channel devices 212 (three fluid channel device 212 in this embodiment), respectively. Each of the plurality of cleaning channels allows the cleaning fluid for cleaning the fluid channel device 212 corresponding to the cleaning channel out of the plurality of fluid channel devices 212 to flow in the direction opposite to the direction in which the treatment target fluid flows in the fluid channel device 212.

The first cleaning channel forming section 60A includes a first cleaning fluid supply channel forming section 61A, which forms a plurality of (in this embodiment, three) cleaning fluid supply channels provided for respective fluid channel devices 211 included in the plurality of fluid treatment modules 20, respectively. Similarly, the second cleaning channel forming section 60B includes a second cleaning fluid supply channel forming section 61B, which forms a plurality of (three in this embodiment) cleaning fluid supply channels provided for the plurality of (three in this embodiment) fluid channel devices 212 included in the plurality of fluid treatment modules 20, respectively. The second cleaning fluid supply channel forming section 61B has an upstream end connected to the first cleaning fluid supply channel forming section 61A. The plurality of cleaning channels are, thus, connected to a common upstream end, that is, the upstream end of the first cleaning channel forming section 60A.

The cleaning fluid supply pump 70 is connected to the upstream end of the first cleaning fluid supply channel forming section 61A. The cleaning fluid supply pump 70 is provided on the upstream side of the position at which the second cleaning fluid supply channel forming section 61B is connected to the first cleaning fluid supply channel forming section 61A, to make a cleaning fluid flow in each of the first cleaning fluid supply channel forming section 61A and the second cleaning fluid supply channel forming section 61B.

The first cleaning fluid supply channel forming section 61A includes a common channel 611 and a plurality of connection channels 612. These are explained as follows.

The common channel 611 has an upstream end, to which the cleaning fluid supply pump 70 is connected. In the common channel 611, the cleaning fluid flows that is fed from the cleaning fluid supply pump 70.

Each of the plurality of connection channels 612 is branched off from the common channel 611. In each of the plurality of connection channels 612, the cleaning fluid flows that has flowed through the common channel 611.

The plurality of connection channels 612 illustrated in FIG. 1 are connected to the intermediate channels 222 of the plurality of fluid treatment modules 20, respectively. Specifically, each of the plurality of connection channels 612 is connected to the intermediate channel 222 of the regular channel 22 at a cleaning fluid introduction position that is set between the channel selector valve 252 located on the downstream side of the fluid channel device 211 corresponding to the connection channel 612 out of the plurality of fluid channel devices 211 and the corresponding fluid channel device 211. This allows the cleaning fluid to flow into the fluid channel device 211 from the outlet side of the fluid channel device 211 through the first cleaning fluid supply channel forming section 61A. In summary, the first cleaning fluid supply channel forming section 61A forms three cleaning fluid supply channels corresponding to the three fluid channel devices 211, respectively, and each cleaning fluid supply channel allows the cleaning fluid to be supplied to the fluid channel device 211 from the cleaning fluid introduction position.

The fluid treatment system 10 further includes a plurality of on-off valves 651 and a plurality of check valves 661, which are provided in the plurality of cleaning fluid supply channels, respectively. Each of the plurality of on-off valves 651 is selectable between a state of allowing the cleaning fluid to flow from the common channel 611 to the intermediate channel 222 and a state of blocking the cleaning fluid. The plurality of on-off valves 651, thus, serve as a plurality of cleaning selector valves that are individually selectable between a state of allowing the flow of the cleaning fluid from the cleaning fluid supply pump 70 to each the cleaning fluid supply channel and a state of blocking the flow. Each of the plurality of check valves 661 is provided closer to the intermediate channel 222 than the on-off valve 651 to prevent the cleaning fluid from flowing into the common channel 611 from the intermediate channel 222.

To clean one of the plurality of fluid channel devices 211, the on-off valve 651 provided in the connection channel 612 corresponding to the fluid channel device 211 to be cleaned is opened to allow the cleaning fluid to flow into the fluid channel device 211. Meanwhile, the on-off valve 651 provided in the connection channel 612 corresponding to the fluid channel device 211 that is not required to be cleaned is closed to prevent the cleaning fluid from flowing into the fluid channel device 211.

The second cleaning fluid supply channel forming section 61B includes a common channel 613 and a plurality of connection channels 614. These are explained as follows.

The common channel 613 has an upstream end connected to the common channel 611 in the first cleaning fluid supply channel forming section 61A. In the common channel 613, the cleaning fluid flows that is supplied from the cleaning fluid supply pump 70.

Each of the plurality of connection channels 614 is branched off from the common channel 613. In each of the plurality of connection channels 614, the cleaning fluid flows that has flowed through the common channel 613.

The plurality of connection channels 614 illustrated in FIG. 1 are connected to respective discharge channels 223 of the plurality of fluid treatment modules 20, respectively. Specifically, each of the plurality of connection channels 614 is connected to the discharge channel 223 of the regular channel 22 at a cleaning fluid discharge position that is set between the channel selector valve 253 located on the downstream side of the fluid channel device 212 corresponding to the connection channel 614 out of the plurality of fluid channel devices 212 and the corresponding fluid channel device 212. This allows the cleaning fluid to flow into the fluid channel device 212 from the outlet side of the fluid channel device 212 through the second cleaning fluid supply channel forming section 61B. The second cleaning fluid supply channel forming section 61B, thus, forms three cleaning fluid supply channels corresponding to the three fluid channel devices 212, respectively, and each cleaning fluid supply channel allows the cleaning fluid to be supplied to the fluid channel device 212 from the cleaning fluid introduction position.

The fluid treatment system 10 further includes a plurality of on-off valves 652 and a plurality of check valves 662, which are provided in the plurality of cleaning fluid supply channels, respectively. Each of the plurality of on-off valves 652 is selectable between a state of allowing the cleaning fluid to flow from the common channel 611 to the discharge channel 223 and a state of blocking the cleaning fluid. The plurality of on-off valves 652, thus, serve as a plurality of cleaning selector valves individually selectable between a state of allowing the flow of the cleaning fluid from the cleaning fluid supply pump 70 to the respective cleaning fluid supply channel and a state of blocking the flow. Each of the plurality of check valves 662 is provided closer to the discharge channel 223 than the on-off valve 652 to prevent the cleaning fluid from flowing into the common channel 611 from the discharge channel 223.

To clean one of the plurality of fluid channel devices 212, the on-off valve 652 provided in the connection channel 614 corresponding to the fluid channel device 212 to be cleaned out of the plurality of connection channels 614 is opened to allow the cleaning fluid to flow into the fluid channel device 212. Meanwhile, the on-off valve 651 provided in the connection channel 612 corresponding to the fluid channel device 212 that is not required to be cleaned is closed to prevent the cleaning fluid from flowing into the fluid channel device 212.

The first cleaning channel forming section 60A further includes a first cleaning fluid discharge channel forming section 62A, which forms a plurality of (in this embodiment, three) cleaning fluid discharge channels provided for respective fluid channel devices 211 of the plurality of fluid treatment modules 20, respectively. Similarly, the second cleaning channel forming section 60B includes a second cleaning fluid discharge channel forming section 62B, which forms a plurality (three in this embodiment) of cleaning fluid discharge channels provided for the plurality of (three in this embodiment) fluid channel devices 212 of the plurality of fluid treatment modules 20, respectively. The second cleaning fluid discharge channel forming section 62B has a downstream end connected to the first cleaning fluid discharge channel forming section 62A. The plurality of cleaning channels are, thus, connected to a common downstream end, that is, the downstream end of the first cleaning channel forming section 60A.

The first cleaning fluid discharge channel forming section 62A includes a common channel 621 and a plurality of connection channels 622. These are explained as follows.

Each of the plurality of connection channels 622 is connected to the common channel 621 to merge with the common channel 621. This allows the cleaning fluid that has flowed through the plurality of connection channels 622 and has been already used to flow in the common channel 621.

The plurality of connection channels 622 illustrated in FIG. 1 are connected to respective supply channels 221 of the plurality of fluid treatment modules 20, respectively. Specifically, each of the plurality of connection channels 622 is connected to the supply channel 221 of the regular channel 22 at a cleaning fluid discharge position that is set between the channel selector valve 251 located on the upstream side of the fluid channel device 211 corresponding to the connection channel 622 out of the plurality of fluid channel devices 211 and the corresponding fluid channel device 211. This allows the cleaning fluid to be discharged to the outside of the system from the inlet side of the fluid channel device 211 through the first cleaning fluid discharge channel forming section 62A. The first cleaning fluid discharge channel forming section 62A, thus, forms three cleaning fluid discharge channels corresponding to the three fluid channel devices 211, respectively, and each cleaning fluid discharge channel allows the cleaning fluid that has flowed through the fluid channel device 211 to be discharged through the cleaning fluid discharge position.

The fluid treatment system 10 further includes a plurality of on-off valves 653 and a plurality of check valves 663, which are provided in the plurality of cleaning fluid discharge channels, respectively. Each of the plurality of on-off valves 653 is selectable between a state of allowing the cleaning fluid to flow from the supply channel 221 to the common channel 621 and a state of blocking the cleaning fluid. The plurality of on-off valves 653, thus, serve as a plurality of cleaning selector valves individually selectable between a state of allowing discharge of the cleaning fluid from the fluid channel device 211 and a state of blocking the discharge. Each of the plurality of check valves 663 is provided closer to the supply channel 221 than the on-off valve 653 to prevent the cleaning fluid from flowing from the common channel 621 into the supply channel 221.

To clean one of the plurality of fluid channel devices 211, the on-off valve 653 provided in the connection channel 622 corresponding to the fluid channel device 211 to be cleaned out of the plurality of connection channels 622 is opened to allow the cleaning fluid that has passed through the fluid channel device 211 to be discharged to the connection channel 622.

The second cleaning fluid discharge channel forming section 62B includes a common channel 623 and a plurality of connection channels 624. These are explained as follows.

Each of the plurality of connection channels 624 is connected to the common channel 623 to merge with the common channel 623. This allows the cleaning fluid that has flowed through the plurality of connection channels 624 and has been already used to flow in the common channel 623.

The plurality of connection channels 624 illustrated in FIG. 1 are connected to respective intermediate channels 222 of the plurality of fluid treatment modules 20, respectively. Specifically, each of the plurality of connection channels 624 is connected to the intermediate channel 222 of the regular channel 22 at a cleaning fluid discharge position that is set between the channel selector valve 251 located on the upstream side of the fluid channel device 212 corresponding to the connection channel 624 out of the plurality of fluid channel devices 212 and the corresponding fluid channel device 212. This allows the cleaning fluid to be discharged to the outside of the system from the inlet side of the fluid channel device 212 through the second cleaning fluid discharge channel forming section 62B. The second cleaning fluid discharge channel forming section 62B, thus, forms three cleaning fluid discharge channels corresponding to the three fluid channel devices 212, respectively, and each cleaning fluid discharge channel allows the cleaning fluid that has flowed through the fluid channel device 212 to be discharged through the cleaning fluid discharge position.

The fluid treatment system 10 further includes a plurality of on-off valves 654 and a plurality of check valves 664, which are provided in the plurality of cleaning fluid discharge channels, respectively. Each of the plurality of on-off valves 654 is selectable between a state of allowing the cleaning fluid to flow from the intermediate channel 222 to the common channel 623 and a state of blocking the cleaning fluid. The plurality of on-off valves 654, thus, serve as a plurality of cleaning selector valves individually selectable between a state of allowing discharge of the cleaning fluid from the fluid channel device 212 and a state of blocking the discharge. Each of the plurality of check valves 664 is provided closer to the intermediate channel 222 than the on-off valve 654 to prevent the cleaning fluid from flowing into the intermediate channel 222 from the common channel 623.

To clean one of the plurality of fluid channel devices 212, the on-off valve 654 provided in the connection channel 624 corresponding to the fluid channel device 212 to be cleaned is opened to allow the cleaning fluid that has passed through the fluid channel device 212 to be discharged to the connection channel 624.

The control device 80 controls predetermined treatments to be performed in the plurality of fluid treatment modules 20, based on the fluid information acquired by the plurality of fluid information acquisition devices 261 and 262, respectively.

Figure 4:
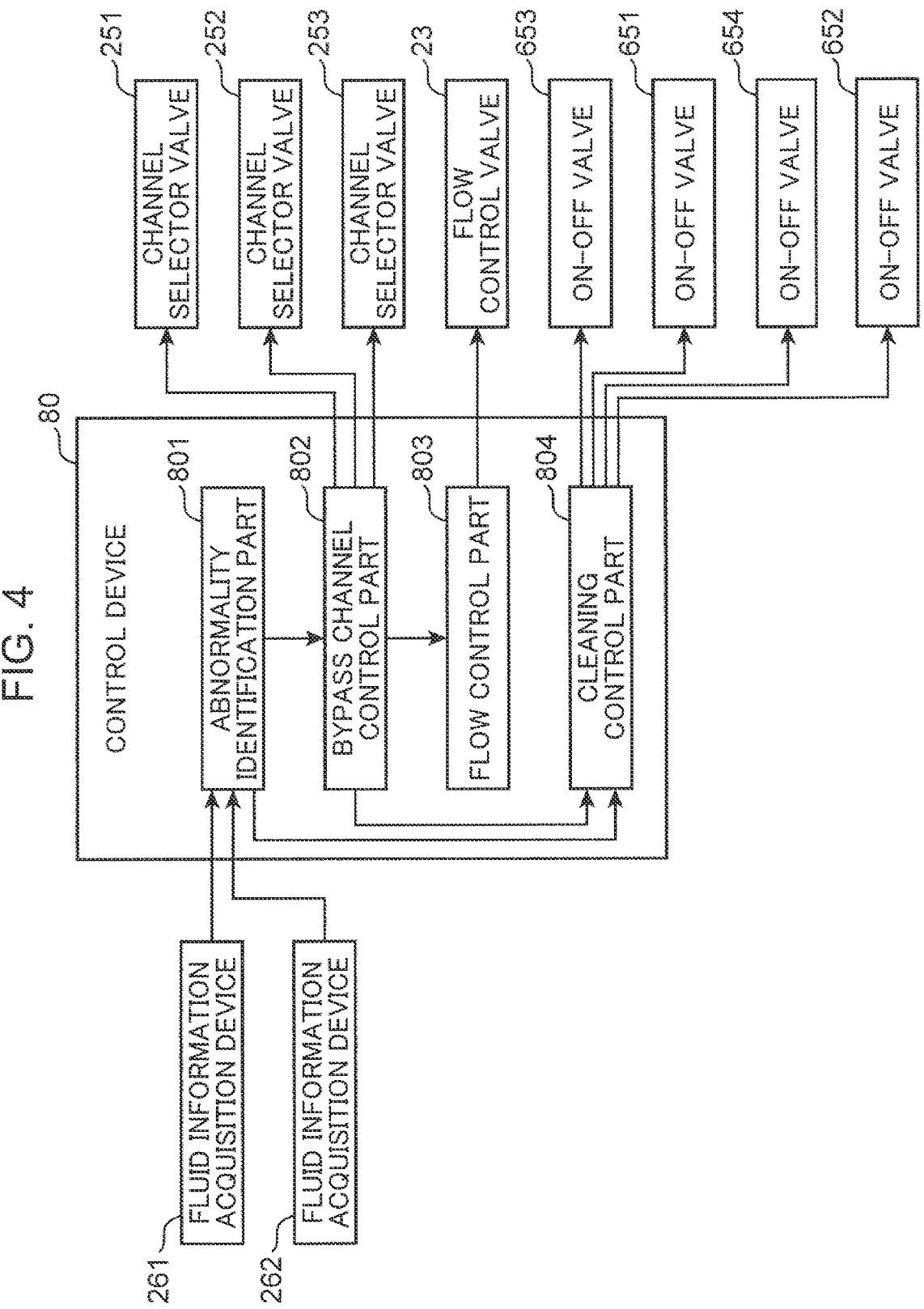
FIG. 4 is a block diagram showing functions of a control device included in the fluid treatment system.

FIG. 4 is a block diagram showing functions of the control device 80.

The control device 80 includes an abnormality identification part 801, a bypass channel control part 802, a flow control part 803, and a cleaning control part 804. These are explained as follows.

The abnormality identification part 801 identifies, for each of the plurality of fluid treatment modules 20, a fluid channel device that is being in an abnormal state out of the plurality of fluid channel devices 211 and 212 based on the fluid information acquired by the plurality of fluid information acquisition devices 261 and 262.

The bypass channel control part 802 switches respective states of the channel selector valves 251 to 253 which are a plurality of bypass selector valves, so as to make the treatment target fluid flow in the bypass channel that bypasses the fluid channel identified to be in an abnormal state by the abnormality identification part 801 out of the plurality of bypass channels 241 and 242.

To prevent the amount of the treatment target fluid that flows into the fluid channel device other than the fluid channel device identified to be in the abnormal state by the abnormality identification part 801 out of the plurality of fluid channel devices 211 and 212, namely, the normal fluid channel device, from exceeding a treatment allowable capacity that indicates the capacity for performing a predetermined treatment in the normal fluid channel device, the flow control part 803 operates the flow control valve 23 in accordance with the number of the normal fluid channel devices and the treatment allowable capacity that is set for the normal fluid channel device to thereby control the flow rate of the treatment target fluid, thereby allowing the predetermined treatment to be performed in the normal fluid channel device.

The cleaning control part 804 operates the on-off valves 651 to 654 which are the plurality of cleaning selector valves to open and close them, so as to make the cleaning fluid flow only in the cleaning channel corresponding to the fluid channel device identified to be in the abnormal state by the abnormality identification part 801 out of the plurality of (six in this embodiment) cleaning channels formed by the first and second cleaning channel forming sections 60A and 60B.

Figure 5:
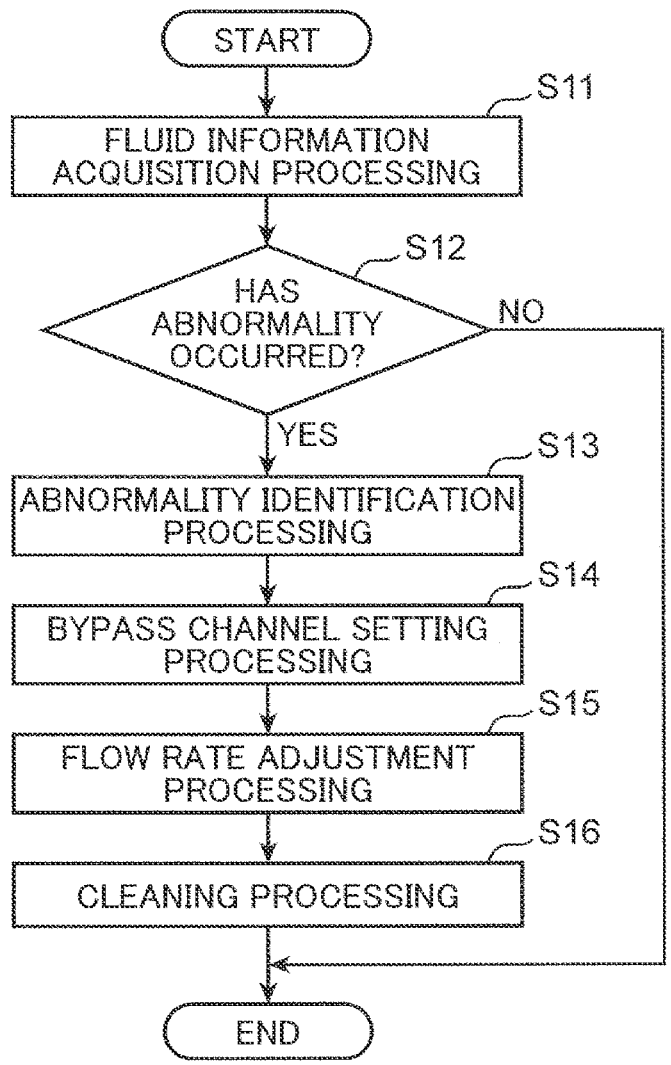
FIG. 5 is a flowchart showing a monitoring processing operation of the fluid treatment system executed by the control device.

FIG. 5 is a flow chart showing the monitoring processing operations of the fluid treatment system 10 performed by the control device 80.

In step S11, the control device 80 executes a fluid information acquisition processing for acquiring fluid information. This processing is performed, for example, by storing the fluid information that is input from the fluid information acquisition devices 261 and 262 in a not-graphically-shown storage device.

In step S12, the abnormality identification part 801 of the control device 80 judges whether or not the fluid information acquired in step S11 indicates occurrence of an abnormality in any of the plurality of fluid channel devices 211 and 212.

When the acquired fluid information indicates occurrence of an abnormality (YES in step S12), the abnormality identification part 801 of the control device 80 executes, in step S13, an abnormality identification processing for identifying the fluid channel device in which an abnormality has occurred. This processing is executed, for example, by identifying the fluid information acquisition device 26 that has input the fluid information indicating the occurrence of an abnormality and the fluid channel device in which the abnormality has occurred.

Figure 6:
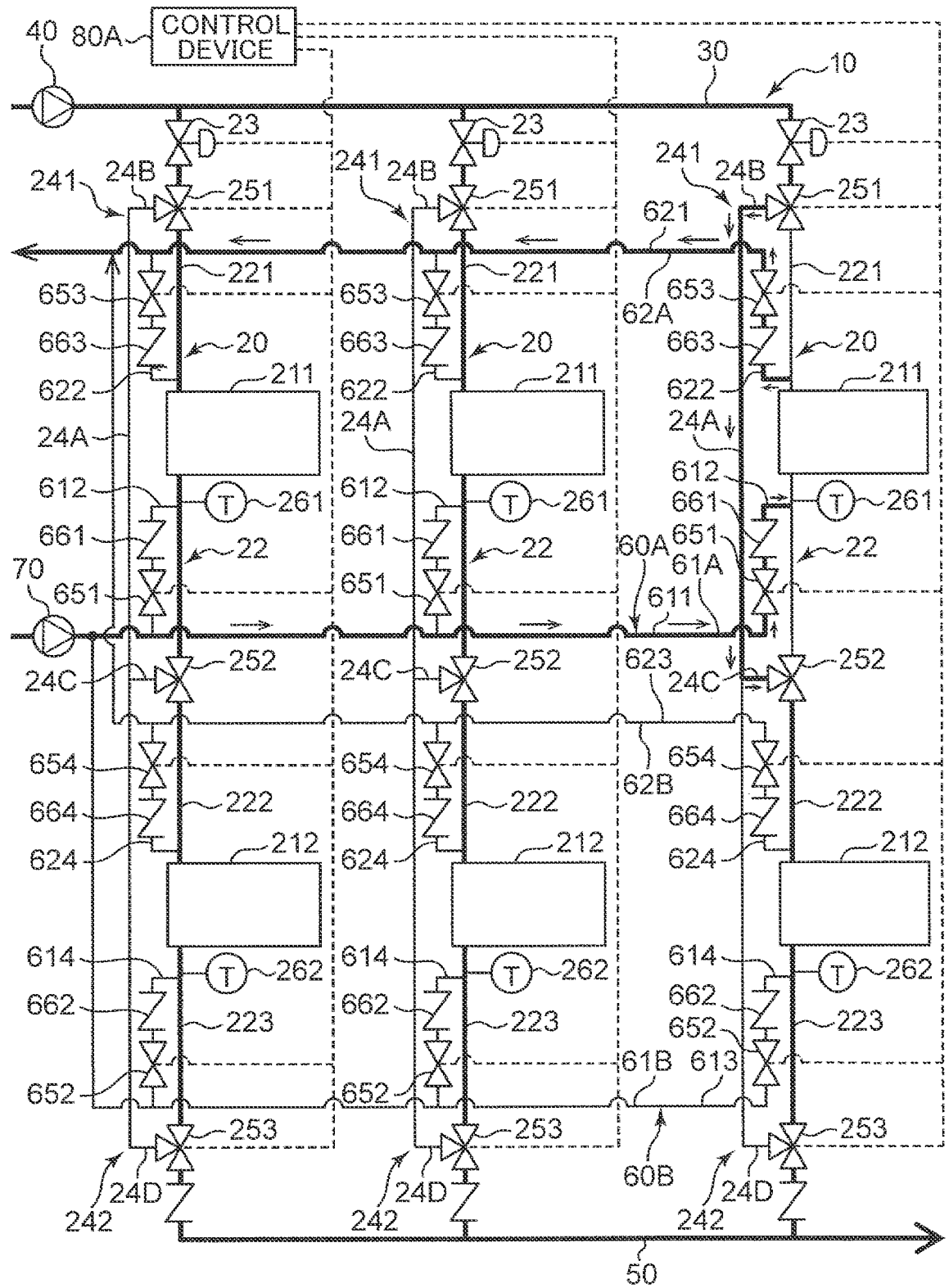
FIG. 6 is a flow sheet showing the flow of the treatment target fluid when an abnormality occurs in a specific upstream fluid channel device in the fluid treatment system.

The bypass channel control part 802 of the control device 80 executes, in step S14, a bypass channel setting processing of opening the bypass channel that bypasses the fluid channel device in which the abnormality has occurred out of the plurality of bypass channels 241 and 242. For example, if an abnormality has occurred in the fluid channel device 211, the states of the channel selector valves 251 and 252 are switched, as shown in FIG. 6, so as to make the channel selector valve 251 allow a fluid to flow in the bypass channel 24 and so as to make the channel selector valve 252 allow a fluid that has flowed through the bypass channel 24, namely, the treatment target fluid, to flow in the fluid channel device 212. This causes to be opened the bypass channel 241 that allows a fluid to flow from the supply channel 221 to the intermediate channel 222 so as to bypass the fluid channel device 211.

The flow control part 803 of the control device 80 executes, in step S15, a flow rate adjustment processing of adjusting the inflow of the treatment target fluid to the normal fluid channel device out of the plurality of fluid channel devices 211 and 212.

In step S15, the cleaning control part 804 of the control device 80 executes a cleaning processing of cleaning the fluid channel device in which an abnormality has occurred out of the plurality of fluid channel devices. For example, when an abnormality occurs in the fluid channel device 211, the cleaning control part 804 executes a control for cleaning the fluid channel device 211 while allowing a treatment target fluid to flow in the bypass channel 241 that bypasses the fluid channel device 211, as shown in FIG. 6. Specifically, the cleaning control part 804 of the control device 80 switches the channel selector valves 251 and 252, which are a plurality of flow selector valves, to the state in which the channel selector valves 251 and 252 block the flow of fluid in the supply channel 221 and the intermediate channel 222, respectively, and opens one on-off valve corresponding to the fluid channel device to be cleaned out of the plurality of on-off valves 651 and 653. This allows a cleaning fluid to be supplied to the fluid channel device 211 through the cleaning fluid supply channel, the cleaning fluid supply position and the intermediate channel 222 that correspond to the opened on-off valve, in this order, and allows the cleaning fluid discharged from the fluid channel device 211 to be discharged to the outside of the system through the supply channel 221, the cleaning fluid discharge position and the cleaning fluid discharge channel.

The control device 80 thereafter ends the monitoring processing operation of the fluid treatment system 10.

When the acquired fluid information is not one indicating any abnormality (NO in step S12), the control device 80 executes a control for performing a predetermined treatment on the treatment target fluid by use of the plurality of fluid treatment modules 20. The control device 80 thereafter ends the monitoring processing of the fluid treatment system 10.

This fluid treatment system 10, where the flow control valve 23 in each of the plurality of fluid treatment modules 20 is provided on the upstream side of the plurality of fluid channel devices 211 and 212 arranged in series in each of the fluid treatment modules 20, allows respective flow rates of the treatment target fluid flowing into the plurality of fluid channel devices 211 and 212 to be adjusted collectively through the common flow control valve 23. This makes it possible to appropriately adjust the respective flow rates of the treatment target fluid flowing into the respective fluid channel devices 211 and 212 of the plurality of fluid treatment modules 20 by use of a small number of flow control valves 23 in the fluid treatment system 10.

In the fluid treatment system 10, even if any of the plurality of fluid channel devices 211 and 212 arranged in series is brought into an abnormal state, making the treatment target fluid flow in the bypass channel that bypasses the fluid channel device in the abnormal state out of the plurality of bypass channels 241 and 242 enables the treatment on the treatment target to be continued by use of the fluid channel device other than the fluid channel device in the abnormal state, namely, the normal fluid channel device. This prevents the fluid treatment module 20 including the fluid channel device in an abnormal state from becoming unable to preform the predetermined treatment on the treatment target fluid.

In the fluid treatment system 10, it is possible to make the cleaning channel run through the fluid channel device brought into the abnormal state from the outlet side to the inlet side thereof while preventing the treatment target fluid from flow into the fluid channel device in the abnormal state. This enables the fluid channel device in the abnormal state to be cleaned while a predetermined treatment is performed in the fluid channel device other than the fluid channel device in the abnormal state out of the plurality of fluid channel devices 211 and 212, namely, the normal fluid channel device.

When an abnormality occurs in any of the plurality of fluid channel devices 211 and 212, the control device 80 of the fluid treatment system 10 can perform an automatic control for performing a predetermined treatment in the fluid channel device other than the fluid channel device with the abnormality, that is, in a normal fluid channel device.

The control device 80 of the fluid treatment system 10 can automatically adjust the flow rate of the treatment target fluid flowing into the normal fluid channel device out of the plurality of fluid channel devices so as to prevent the amount of the treatment target fluid from exceeding the preset treatment allowable capacity, i.e., to appropriately adjust the flow rate of the treatment target fluid flowing into the normal fluid channel device.

In the fluid treatment system 10, it is possible to automatically clean the fluid channel device corresponding to the opened bypass channel 24, that is, the fluid channel device in which an abnormality has occurred, out of the plurality of fluid channel devices.

Figure 7:
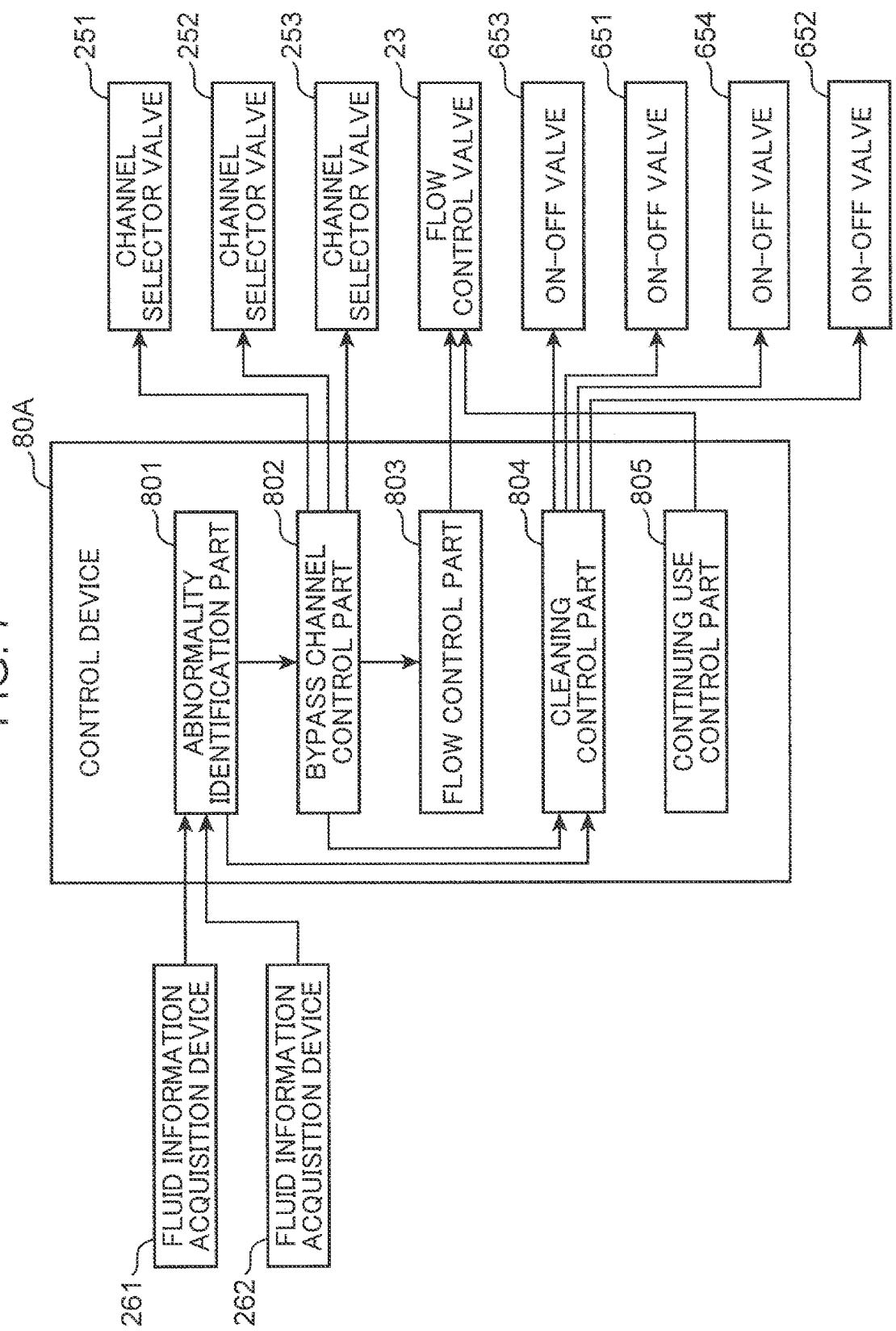
FIG. 7 is a block diagram showing functions of a control device of a fluid treatment system according to a variation of the embodiment of the present invention.

Next will be described a variation of the above embodiment with reference to FIG. 7, which is a block diagram showing functions of a control device 80A included in the fluid treatment system according to the variation.

The control device 80A includes a continuing use control part 805 in addition to components equivalent to those included in the control device 80. Instead of allowing a treatment target fluid to flow in a bypass channel that bypasses the fluid channel device identified to be in an abnormal state by the abnormality identification part 801 out of the plurality of bypass channels 241 and 242, the continuing use control part 805 controls a flow control valve 23 in accordance with a reduced treatment capacity, which is a capacity reduced from the treatment allowable capacity because of the occurrence of the abnormality therein and indicating the capacity for performing the predetermined treatment in the fluid channel device identified to be in the abnormal state by the abnormality identification part 801, so as to allow a predetermined treatment to be performed by each of the plurality of fluid channel devices including the fluid channel device identified to be in the abnormal state by the abnormality identification part 801 out of the plurality of fluid channel devices 211 and 212.

Figure 8:
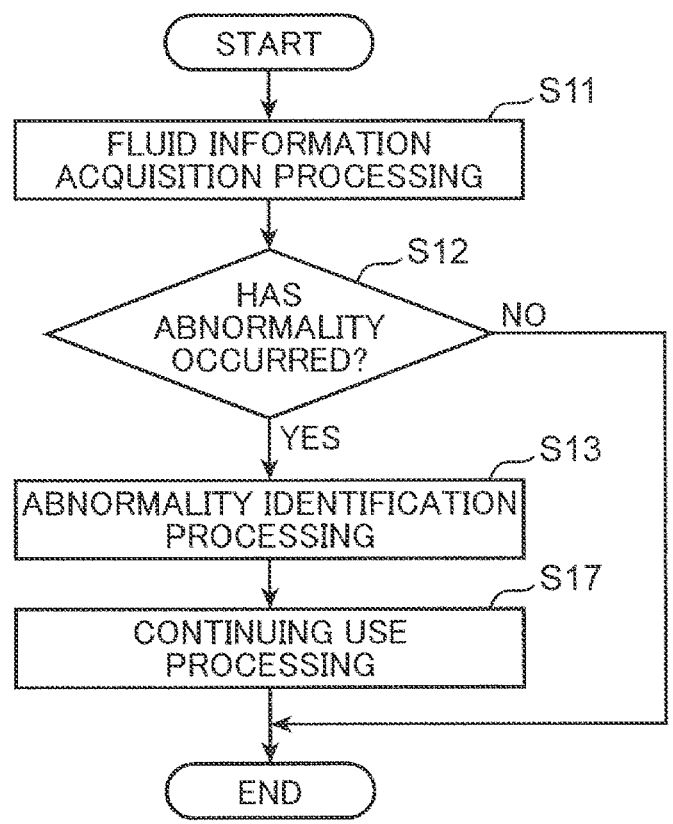
FIG. 8 is a flowchart showing the monitoring processing operation of the fluid treatment system executed by the control device according to the variation.

FIG. 8 is a flowchart showing the monitoring processing operation of the fluid treatment system, the operation being executed by the control device 80A.

The monitoring processing operation performed by the control device 80A differs from the monitoring processing operation performed by the control device 80 in inclusion of a continuing use processing (step S17) in place of the bypass channel setting processing (step S14 in FIG. 5), the flow rate adjustment processing (step S15 in FIG. 5) and the cleaning process (step S16 in FIG. 5).

The continuing use processing includes controlling the flow control valve 23 so as to allow the fluid channel device in an abnormal state out of the plurality of fluid channel devices to perform a predetermined treatment within the range in which the fluid channel device is capable of performing the predetermined treatment. For example, in the case where an abnormality has occurred in the fluid channel device 211, which is however still capable of performing the treatment within a treatment capacity reduced to 50% of the originally set treatment capacity, namely, the treatment capacity, the continuing use control part 805 has the predetermined treatment performed within the treatment allowable range, i.e., the treatment capacity of 50% of the originally set treatment capacity, in the fluid channel device 211.

In this fluid treatment system, the use of the fluid channel device in the abnormal state can be continued with restriction of the inflow amount of the treatment target fluid to the fluid channel device in the abnormal state within a range in which the predetermined treatment can be performed by the fluid channel device.

The embodiments of the present invention, which have been described above in detail, are only examples; the present invention, therefore, should not be construed in any way as being limited by the description of the above-mentioned embodiments.

Although the above embodiment includes the interconnection of the bypass channel 241 bypassing the fluid channel device 211 and the bypass channel 242 bypassing the fluid channel device 212, the bypass channels 241 and 242 may be independent of each other.

Although each of the channel selector valves 251, 252 and 253 in the above embodiment is formed of a three-way selector valve capable of serving as both a bypass selector valve and a flow selector valve, the bypass selector valve and the channel selector valve may be configured by respective valves independent of each other. On the other hand, at least a part of the plurality of bypass selector valves doubling as the flow selector valve allows the total number of valves in the entire system to be reduced.

The flow selector valve is optional. For example, when an abnormality occurs in any of the fluid channel device, it may be performed to open the bypass channel corresponding thereto while allowing the inflow of the treatment target fluid to the fluid channel device; this also enables the bypass channel to allow the treatment target fluid to be supplied to the fluid channel device downstream of the fluid channel device where the abnormality has occurred. On the other hand, the provision of the flow selector valve makes it possible to prevent wasteful supply of the treatment target fluid to the fluid channel device where abnormality has occurred.

In the above embodiment, with respect to the direction in which the treatment target fluid flows in the regular channel 22, respective cleaning fluid supply positions are set between the channel selector valves 252 and 253 which are flow selector valves on respective downstream sides of the fluid channel devices 211 and 212 and the fluid channel devices 211 and 212, respectively, and respective cleaning fluid discharge positions are set between the channel selector valve 251 and 252 which are flow selector valves at respective upstream sides of the fluid channel devices 211 and 212 and the fluid channel devices 211 and 212, respectively, thereby allowing the cleaning fluid to flow in the fluid channel devices 211 and 212 from the outlet side toward the inlet side thereof; however, it is also possible to set respective cleaning fluid supply positions between the channel selector valves 251 and 252 which are flow selector valves on the respective upstream sides of the fluid channel device 211 and 212 and the fluid channel device 211 and 212, and to set respective cleaning fluid discharge positions between the channel selector valves 252 and 253 which are flow selector valves on respective downstream sides of the fluid channel devices 211 and 212 and the fluid channel devices 211 and 212, to thereby allow the cleaning fluid to flow through each of the fluid channel devices 211 and 212 from the inlet side to the outlet side thereof. In other words, it is also possible to connect the cleaning fluid supply pump 70 to the downstream end of the first cleaning fluid discharge channel forming section 62A in the fluid treatment system shown in FIG. 1 as a common upstream end of the plurality of cleaning channels, and to let the cleaning fluid be discharged to the outside of the system through the upstream end of the first cleaning fluid supply channel forming section 61 as a downstream end.

The cleaning channel is optional. For example, when an abnormality occurs in any of the fluid channel devices, the fluid channel device may be immediately replaced with a normal fluid channel device without being cleaned.

As described above, a fluid treatment system is provided, allowing the flow rate of treatment target fluid that flows into a plurality of fluid channel devices to be appropriately adjusted by use of a small number of flow control valves.

Provided is a fluid treatment system, including a plurality of fluid treatment modules arranged in parallel with each other, each of the fluid treatment modules performing a predetermined treatment on a treatment target fluid as an object to be treated while allowing the treatment target fluid to flow in the fluid treatment module to thereby generate a proposed target fluid. Each of the plurality of fluid treatment modules includes: a regular channel that allows the treatment target fluid to flow in the regular channel; a plurality of fluid channel devices arranged in series along the regular channel, each of the plurality of fluid channel devices being configured to perform a predetermined treatment on the treatment target fluid while allowing the treatment target fluid to flow in the fluid channel device, the plurality of fluid channel devices being provided in the regular channel so as to cause the treatment target fluid flowing in the regular channel to flow through all of the plurality of fluid channel devices; a flow control valve provided on an upstream side of the plurality of fluid channel devices in the regular channel with respect to a direction in which the treatment target fluid flows, the flow control valve being operable to change a flow rate of the treatment target fluid flowing into each of the plurality of fluid channel devices; a plurality of bypass channels provided for the plurality of fluid channel devices, respectively, each of the plurality of bypass channels allowing the treatment target fluid to flow so as to bypass the fluid channel device that corresponds to the bypass channel out of the plurality of fluid channel devices; and a plurality of bypass selector valves provided for the plurality of bypass channels, respectively, each of the plurality of bypass selector valves being selectable between a state of allowing the treatment target fluid to flow in the bypass channel corresponding to the bypass selector valve out of the plurality of bypass channels and a state of blocking the treatment target fluid.

In the fluid treatment system, where the flow control valve is provided on the upstream side of the plurality of fluid channel devices arranged in series in each of the plurality of fluid treatment modules, the flow rate of the treatment target fluid flowing into each of the plurality of fluid channel devices can be adjusted collectively by the common flow control valve. This enables the inflow amount of the treatment target fluid to the plurality of fluid channel devices of the plurality of fluid treatment modules to be appropriately adjusted by use of a small number of the flow control valves.

In the fluid treatment system, it is possible to prevent the treatment target fluid from flowing in the bypass channel and allow the treatment target fluid to flow in each of the plurality of fluid channel devices arranged in series when all of the plurality of fluid channel devices arranged in series are in a normal state, and it is also possible to make the treatment target fluid flow in the bypass channel for bypassing the fluid channel device brought into the abnormal state by operating the bypass selector valve provided correspondingly to the fluid channel device in an abnormal state when any of the plurality of fluid channel devices arranged in series is brought into the abnormal state. This allows the treatment on the treatment target fluid to be continued by use of the fluid channel device other than the fluid channel device in the abnormal state out of the plurality of fluid channel devices, namely, the normal fluid channel device. This results in prevention of the fluid treatment module including the fluid channel device in the abnormal state from becoming unable to perform the predetermined treatment therein.

In addition, the above-mentioned fluid treatment system, which is capable of preventing the treatment target fluid from flowing in the fluid channel device in the abnormal state, enables the fluid channel device in the abnormal state to be replaced with a normal fluid channel device while allowing the predetermined treatment to be performed in the normal fluid channel device.

The fluid treatment system, preferably, further includes a plurality of flow selector valves each provided at a connection position where the regular channel and the bypass channel is connected to each other or a position closer to the fluid channel device corresponding to the bypass channel than the connection position, each of the plurality of flow selector valves being selectable between a state of allowing the flow of the treatment target fluid in the regular channel and a state of blocking the flow.

In this mode, when the flow in any of the bypass channel is allowed, the flow selector valve corresponding to the bypass channel out of the plurality of flow selector valves can be switched to the state of blocking the flow of the treatment target fluid, which can prevent the treatment target fluid from being wastefully supplied to the fluid channel where abnormality has occurred.

In this mode, it is preferable that the fluid treatment system further includes a plurality of cleaning channels provided for the plurality of fluid channel devices, respectively. Each of the plurality of cleaning channels allows a cleaning fluid for cleaning the fluid channel device to flow in the fluid channel device corresponding to the cleaning channel device out of the plurality of fluid channel devices. Each of the plurality of cleaning channels includes: a cleaning fluid supply channel connected to the regular channel at a cleaning fluid introduction position that is set between the flow selector valve on an upstream side or a downstream side of the fluid channel device corresponding to the cleaning channel and the corresponding fluid channel device, the cleaning fluid supply channel allowing the cleaning fluid to be supplied from the cleaning fluid introduction position to the fluid channel device through the regular channel; and a cleaning fluid discharge channel connected to the regular channel at a cleaning fluid discharge position that is set between the fluid channel device and the flow selector valve on the opposite side to the cleaning fluid introduction position across the fluid channel device, the cleaning fluid discharge channel allowing the cleaning fluid having flowed through the fluid channel device to be discharged through the cleaning fluid discharge position.

In this mode, closing the on-off valve provided correspondingly to the fluid channel device in the abnormal state allows the cleaning fluid to flow in the cleaning channel corresponding to the fluid channel device in the abnormal state while preventing the treatment target fluid from flowing into the fluid channel device in the abnormal state, thereby enabling the fluid channel device in the abnormal state to be cleaned. It is, thus, possible to clean the fluid channel device in the abnormal state while performing a predetermined treatment in the fluid channel device other than the fluid channel device in the abnormal state, namely, the normal fluid channel device, out of the plurality of fluid channel devices.

In this mode, it is preferable that the plurality of cleaning channels are connected to a common upstream end that is connectable to a cleaning fluid supply pump, and the fluid treatment system further includes a plurality of cleaning selector valves provided in the plurality of cleaning channels, respectively, and being individually selectable between a state of allowing the flow of the cleaning fluid in the cleaning channels and a state of blocking the flow.

This mode allows a common cleaning fluid supply pump to be shared by the plurality of cleaning channels. Moreover, individually switching respective states of the plurality of cleaning selector valves enables the cleaning fluid to be supplied from the cleaning fluid supply pump only to the fluid channel device required to be cleaned, through the cleaning channel connected to the fluid channel device to be cleaned.

The fluid treatment system, preferably, further includes a plurality of fluid information acquisition devices provided for the plurality of fluid channel devices, respectively, to acquire fluid information that is information on the treatment target fluid flowing in the fluid channel device and used for judging whether the fluid channel device is in an abnormal state of being unable to perform the predetermined treatment, and a control device that controls the predetermined treatment performed in each of the plurality of fluid treatment modules, based on the fluid information acquired by each of the plurality of fluid information acquisition devices, wherein the control device includes an abnormality identification part that identifies a fluid channel device in the abnormal state out of the plurality of the fluid channel devices for each of the plurality of fluid treatment modules, a bypass channel control part that switches the states of the plurality of bypass selector valves so as to make the treatment target fluid flow in the bypass channel that bypasses the fluid channel device that is identified to be in the abnormal state by the abnormality identification part out of the plurality of bypass channels, and a flow control part that operates the flow control valve in accordance with the number of normal fluid channel devices other than the fluid channel device identified to be in the abnormal state by the abnormality identification part and a treatment allowable capacity, which is set in advance for the normal fluid channel device to indicate a capacity for performing the predetermined treatment in the normal fluid channel device, so as to prevent the amount of the treatment target fluid that flows into the normal fluid channel device from exceeding the treatment allowable capacity.

The control device in this mode, when an abnormality occurs in any of the plurality of fluid channel device, can perform an automatic control for allowing the predetermined treatment to be performed in the fluid channel device other than the fluid channel device where the abnormality has occurred, namely, the normal fluid channel device.

Besides, the flow rate of the treatment target fluid is automatically adjusted so as to prevent the amount of the treatment target fluid flowing into the normal fluid channel device from exceeding the preset treatment allowable capacity. Thus, the flow rate of the treatment target fluid flowing into the normal fluid channel device is appropriately adjusted.

The control device, instead of allowing the treatment target fluid to flow in the bypass channel that bypasses the fluid channel device identified to be in the abnormal state by the abnormality identification part out of the plurality of bypass channels, may further include a continuing use control part that operates the flow control valve in accordance with a reduced treatment capacity, which is a capacity reduced from the treatment allowable capacity because of an occurrence of the abnormality and indicating the capacity for performing the predetermined treatment in the fluid channel device identified to be in the abnormal state by the abnormality identification part, so as to allow the predetermined treatment to be performed by each of the plurality of fluid channel devices including the fluid channel device identified to be in the abnormal state by the abnormality identification part.

In this mode, restricting the inflow amount of the treatment target fluid to the fluid channel device in the abnormal state within a range allowable to perform the predetermined treatment in the fluid channel device in the abnormal state allows the use of the fluid channel device to be continued in spite of the abnormal state thereof.

Besides, in the mode where the fluid treatment system includes the plurality of cleaning channels and the plurality of cleaning selector valves, it is preferable that the control device further includes a cleaning control part that operates the plurality of cleaning selector valves so as to allow the cleaning fluid to flow only in the cleaning channel corresponding to the fluid channel device identified to be in the abnormal state by the abnormality identification part out of the plurality of cleaning channels.

This mode enables the cleaning fluid to be automatically supplied only to the fluid channel device in an abnormal state required to be cleaned.

The invention claimed is:
1. A fluid treatment system comprising
a plurality of fluid treatment modules arranged in parallel with each other, each of the fluid treatment modules performing a predetermined treatment on a treatment target fluid, composed of a plurality of kinds of raw materials, as an object to be treated while allowing the treatment target fluid to flow in the fluid treatment module to thereby generate a proposed target fluid, the predetermined treatment being an adjustment of a reaction temperature of the treatment target fluid, wherein
each of the plurality of fluid treatment modules includes:
a regular channel that allows the treatment target fluid to flow in the regular channel;
a plurality of fluid channel devices arranged in series along the regular channel, each of the plurality of fluid channel devices being a microchannel reactor, each of the plurality of fluid channel devices being configured to perform a predetermined treatment on the treatment target fluid while allowing the treatment target fluid to flow in the fluid channel device, the plurality of fluid channel devices being provided in the regular channel so as to cause the treatment target fluid flowing in the regular channel to flow through all of the plurality of fluid channel devices;

a flow control valve provided on an upstream side of the plurality of fluid channel devices in the regular channel with respect to a direction in which the treatment target fluid flows, the flow control valve being operable to change a flow rate of the treatment target fluid flowing into each of the plurality of fluid channel devices;

a plurality of bypass channels provided for the plurality of fluid channel devices, respectively, each of the plurality of bypass channels allowing the treatment target fluid to flow so as to bypass the fluid channel device that corresponds to the bypass channel out of the plurality of fluid channel devices; and a plurality of bypass selector valves provided for the plurality of bypass channels, respectively, each of the plurality of bypass selector valves being selectable between a state of allowing the treatment target fluid to flow in the bypass channel corresponding to the bypass selector valve out of the plurality of bypass channels and a state of blocking the treatment target fluid.

2. The fluid treatment system according to claim 1, further comprising a plurality of flow selector valves each provided at a connection position where the regular channel and the bypass channel is connected to each other or a position closer to the fluid channel device corresponding to the bypass channel than the connection position, each of the plurality of flow selector valves being selectable between a state of allowing the flow of the treatment target fluid in the regular channel and a state of blocking the flow.

3. The fluid treatment system according to claim 2, further comprising a plurality of cleaning channels provided for the plurality of fluid channel devices, respectively, wherein each of the plurality of cleaning channels allows a cleaning fluid for cleaning the fluid channel device to flow in the fluid channel device corresponding to the cleaning channel out of the plurality of fluid channel devices in an opposite direction to a direction in which the cleaning fluid flows in the fluid channel device, and each of the plurality of cleaning channels includes: a cleaning fluid supply channel connected to the regular channel at a cleaning fluid introduction position that is set between the flow selector valve on an upstream side or a downstream side of the fluid channel device corresponding to the cleaning channel and the corresponding fluid channel device, the cleaning fluid supply channel allowing the cleaning fluid to be supplied from the cleaning fluid introduction position to the fluid channel device through the regular channel; and a cleaning fluid discharge channel connected to the regular channel at a cleaning fluid discharge position that is set between the flow selector valve on an opposite side to the cleaning fluid introduction position across the fluid channel device and the fluid channel device, the cleaning fluid discharge channel allowing the cleaning fluid having flowed through the fluid channel device to be discharged through the cleaning fluid discharge position.

4. The fluid treatment system according to claim 3, wherein the plurality of cleaning channels are connected to a common upstream end that is connectable to a cleaning fluid supply pump, and the fluid treatment system further comprises a plurality of cleaning selector valves provided in the plurality of cleaning channels, respectively, and being individually selectable between a state of allowing the flow of the cleaning fluid in the cleaning channel and a state of blocking the flow.

5. The fluid treatment system according to claim 1, further comprising: a plurality of fluid information acquisition devices provided for the plurality of fluid channel devices, respectively, to acquire fluid information that is information on the treatment target fluid flowing in the fluid channel device and used for judging whether the fluid channel device is in an abnormal state of being unable to perform the predetermined treatment; and a control device that controls the predetermined treatment performed in each of the plurality of fluid treatment modules, based on the fluid information acquired by each of the plurality of fluid information acquisition devices, wherein the control device includes an abnormality identification part that identifies a fluid channel device in the abnormal state out of the plurality of the fluid channel devices for each of the plurality of fluid treatment modules, a bypass channel control part that switches the states of the plurality of bypass selector valves so as to make the treatment target fluid flow in the bypass channel that bypasses the fluid channel device that is identified to be in the abnormal state by the abnormality identification part out of the plurality of bypass channels, and a flow control part that operates the flow control valve in accordance with the number of normal fluid channel devices other than the fluid channel device identified to be in the abnormal state by the abnormality identification part and a treatment allowable capacity, which is set in advance for the normal fluid channel device to indicate a capacity for performing the predetermined treatment in the normal fluid channel device, so as to prevent the amount of the treatment target fluid that flows into the normal fluid channel device from exceeding the treatment allowable capacity, to thereby allow the predetermined treatment to be performed in the normal fluid channel device.

6. The fluid treatment system according to claim 5, wherein the control device further includes a continuing use control part that operates the flow control valve in accordance with a reduced treatment capacity, which is a capacity reduced from the treatment allowable capacity because of an occurrence of the abnormality and indicating the capacity for performing the predetermined treatment in the fluid channel device identified to be in the abnormal state by the abnormality identification part, so as to allow the predetermined treatment to be performed by each of the plurality of fluid channel devices including the fluid channel device identified to be in the abnormal state by the abnormality identification part.

7. The fluid treatment system according to claim 5, further comprising: a plurality of flow selector valves each provided at a connection position where the regular channel and the bypass channel is connected to each other or a position closer to the fluid channel device corresponding to the bypass channel than the connection position; and a plurality of cleaning channels provided for the plurality of fluid channel devices, respectively, wherein: each of the plurality of flow selector valves is configured to be selectable between a state of allowing the flow of the treatment target fluid in the regular channel and a state of blocking the flow; each of the plurality of cleaning channels allows a cleaning fluid for cleaning the fluid channel device to flow in the fluid channel device corresponding to the cleaning channel out of the plurality of fluid channel devices in an opposite direction to a direction in which the cleaning fluid flows in the fluid channel device; each of the plurality of cleaning channels includes a cleaning fluid supply channel connected to the regular channel at a cleaning fluid introduction position that is set between the flow selector valve on an upstream side or a downstream side of the fluid channel device corresponding to the cleaning channel and the corresponding fluid channel device, the cleaning fluid supply channel allowing the cleaning fluid to be supplied from the cleaning fluid introduction position to the fluid channel device through the regular channel, and a cleaning fluid discharge channel connected to the regular channel at a cleaning fluid discharge position that is set between the flow selector valve on an opposite side to the cleaning fluid introduction position across the fluid channel device and the fluid channel device, the cleaning fluid discharge channel allowing the cleaning fluid having flowed through the fluid channel device to be discharged through the cleaning fluid discharge position; and the plurality of cleaning channels are connected to a common upstream end that is connectable to a cleaning fluid supply pump, the fluid treatment system further comprising a plurality of cleaning selector valves provided to the plurality of cleaning channels, respectively, and being individually selectable between a state of allowing the flow of the cleaning fluid in the cleaning channel and a state of blocking the flow, the control device further including a cleaning control part that operates the plurality of cleaning selector valves so as to allow the cleaning fluid to flow only in the cleaning channel corresponding to the fluid channel device identified to be in the abnormal state by the abnormality identification part out of the plurality of cleaning channels.

\* \* \* \* \*